Figure 1:
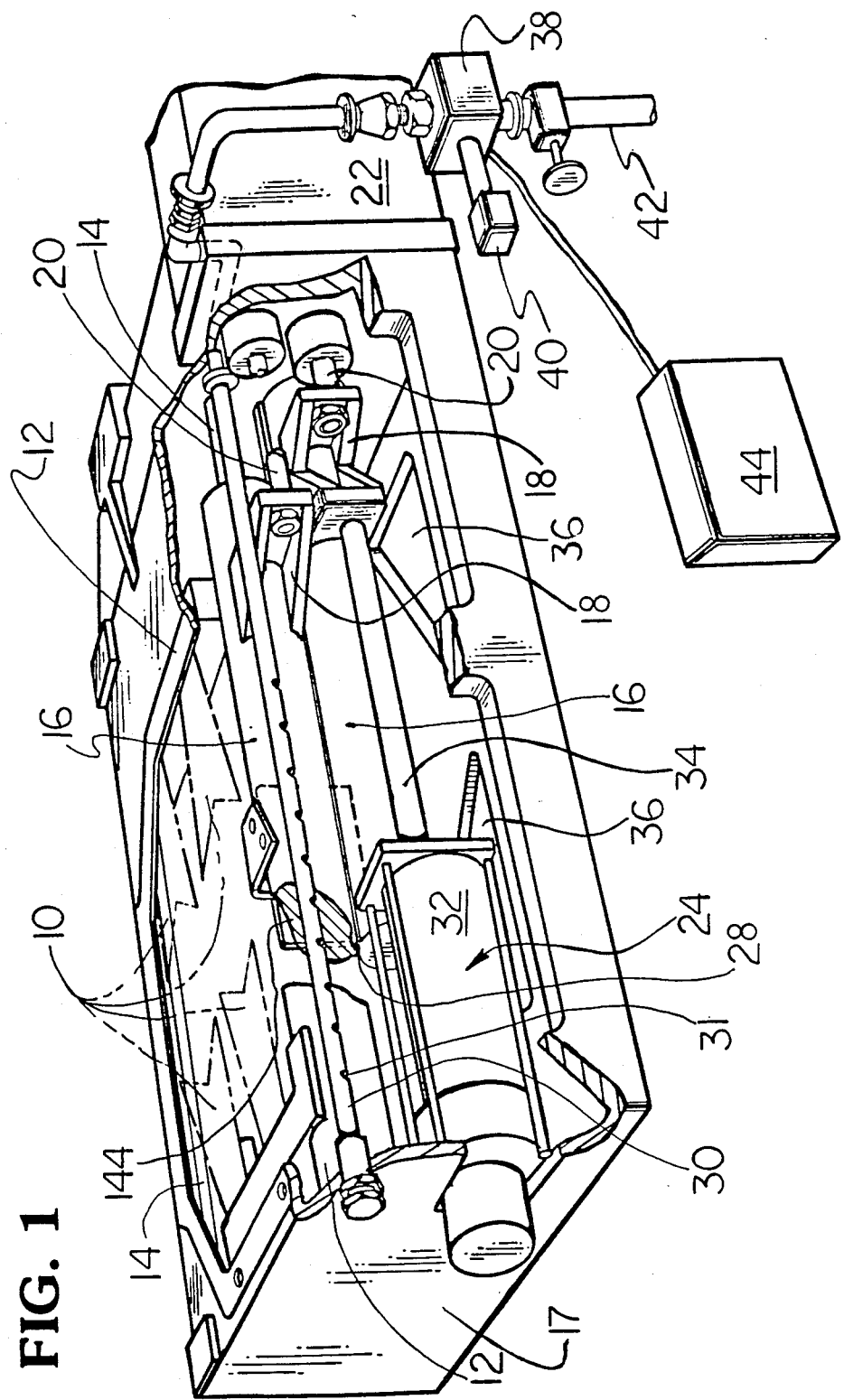

United States Patent [19]

Wright

[11] Patent Number: 4,859,227
[45] Date of Patent: Aug. 22, 1989

[54] STRAIGHT LINE SHEAR MECHANISM

[75] Inventor: Douglas W. Wright, Tarriffville, Conn.

[73] Assignee: Emhart Industries, Inc., Farmington, Conn.

[21] Appl. No.: 303,780

[22] Filed: Jan. 27, 1989

[51] Int. Cl.⁴ .............................................. C03B 7/10
[52] U.S. Cl. .......................................... 65/334; 65/221; 65/332; 65/326; 83/578; 83/623
[58] Field of Search ............... 65/221, 326, 332, 334; 83/578, 623

[56] References Cited

U.S. PATENT DOCUMENTS

| | | | |
|---|---|---|---|
| 4,214,494 | 7/1980 | Dahms | 83/623 X |
| 4,215,611 | 8/1980 | Dahms | 83/623 X |
| 4,699,643 | 10/1987 | Kulig | 65/332 |
| 4,781,746 | 11/1988 | Doughty et al. | 65/332 |
| 4,791,845 | 12/1988 | Wright | 65/334 |
| 4,813,994 | 3/1989 | Kulig | 65/334 |

Primary Examiner—Arthur Kellogg
Attorney, Agent, or Firm—Spencer T. Smith

[57] ABSTRACT

A straight line shear mechanism has rack driven shears which are operated by a pneumatic cylinder. The shear slides provide a barrier to infrared energy directed at the pneumatic cylinder. To cool the cylinder, a perforated cooling tube is connected to ambient air when the mechanism is operating and is connected to water when the mechanism is not operating.

2 Claims, 1 Drawing Sheet

STRAIGHT LINE SHEAR MECHANISM

The present invention relates to straight line shears for cutting gobs from continuously fed runners of molten glass.

In a straight line shear, such as is disclosed in U.S. Pat. No. 4,699,643 opposed shear assemblies periodically cut gobs from a corresponding number of runners of molten glass. This molten glass distributes a tremendous amount of radiant energy, and objects proximate to this molten glass will get hot as a result of this radiant energy. To drive the shear assemblies, a pneumatic cylinder is used. This cylinder is vulnerable to heat, and accordingly, routinely fails. Such failure results in a stoppage of the entire I.S. machine and this impacts overall productivity.

It is accordingly an object of the present invention to improve the productivity of the shear mechanism by protecting the pneumatic cylinder from excessive heat.

Other objects and advantages of the present invention will become apparent from the following portion of the specification and from the following drawing which illustrates in accordance with the mandate of the patent statutes a presently preferred embodiment incorporating the principles of the invention.

Referring to the drawing:

The sole FIGURE is a top perspective view, partially broken away, of a straight line shear.

Runners of molten glass (not shown) are fed, by gravity, to the straight line shear, where discrete gobs (also not shown) are formed by the cutting action of a corresponding number of opposed shear 10 pairs. Each set of shears 10 is secured to an L-shaped slide 12 which is displaceable along parallel guide rails 14. The L-shaped slides have elongated, enlarged cylindrical portions 16 which are stacked vertically to form a barrier to the infrared energy of the gobs falling through the shear housing 17. To each cylindrical portion is attached a bracket 18 which is connected to opposed rack elements 20 of a rack and pinion mechanism 22 so that when an air cylinder 24 connected to one of the brackets 18 is operated, the shear 10 pairs will be conjointly displaced towards or away from each other.

The pneumatic cylinder 24 is, in effect, located within a chamber defined at the ends, the top, bottom and one side by the housing or frame 17 and defined by the vertically stacked enlarged cylindrical portions 16 (these cylindrical portions may have adjacent upwardly and downwardly projecting ribs 28 to complete the infrared barrier).

To cool this chamber and the pneumatic cylinder 24 which is within it, a cooling tube 30 extends between the housing 17 end walls. Downwardly opening holes 31 direct coolant under pressure against the cylindrical housing 32, and rod 34 of the pneumatic cylinder 24 and the coolant leaves the chamber through suitable openings 36 defined in the bottom of the housing. The cooling tube is alternately connected via a three-way valve 38 to either a line 40 of ambient air under pressure or to a supply of pressurized water 42. A controller 44 controls the operation of the shear mechanism and shifts that valve 38 to connect the air line 40 during shear operation and to connect the water line 42 when shear operation is turned off. A baffle 144, secured to the housing, closes an area which will be open when shears are fully retracted.

I claim:

1. A straight line shear mechanism for cutting discrete gobs from a runner of molten glass which is to be formed into a glass container comprising a housing, a pair of opposed shear blade assemblies mounted for simultaneous displacement from retracted positions to advanced shear positions, means for displacing said shear blade assemblies including an air cylinder means having a cylindrical housing and an outwardly extending rod, movable between retracted and fully advanced positions;

means for cooling said air cylinder means including an elongated tube extending parallel to said air cylinder means, a plurality of holes defined in said tube, said holes selectively located to direct fluid discharged from said tube towards said cylindrical housing and said rod when said rod is at said fully advanced positions, a source of pressurized ambient air, a source of pressurized water, means for supplying said pressurized ambient air to said tube when said shear mechanism is operating and for supplying said pressurized water to said tube when said shear mechanism is not operating.

2. A straight line shear mechanism according to claim 1, wherein said shear blade assemblies include a pair of vertically stacked elongated cylindrical portions for blocking infrared radiation emitted by the gobs from striking said pneumatic cylinder.

* * * * *